US012713177B2

(12) United States Patent
Jain et al.

(10) Patent No.: US 12,713,177 B2
(45) Date of Patent: Aug. 18, 2026

(54) AUDIO APPARATUS AND A HEAD MOUNTED DEVICE INCLUDING THE AUDIO APPARATUS

(71) Applicant: TESSERACT IMAGING LIMITED, Navi Mumbai (IN)

(72) Inventors: Devesh Ramcharan Jain, Navi Mumbai (IN); Tanmay Badhan, Navi Mumbai (IN); Arpit Lasod, Navi Mumbai (IN); Navin Yeshwantharao Jampala, Navi Mumbai (IN); Mainak Mitra, Navi Mumbai (IN); Ashish Gupta, Navi Mumbai (IN); Kshitij Marwah, Navi Mumbai (IN)

(73) Assignee: TESSERACT IMAGING LIMITED, Navi Mumbai (IN)

( * ) Notice: Subject to any disclaimer, the term of this patent is extended or adjusted under 35 U.S.C. 154(b) by 341 days.

(21) Appl. No.: 18/690,660

(22) PCT Filed: Sep. 8, 2022

(86) PCT No.: PCT/IN2022/050804
§ 371 (c)(1),
(2) Date: Mar. 8, 2024

(87) PCT Pub. No.: WO2023/037386
PCT Pub. Date: Mar. 16, 2023

(65) Prior Publication Data

US 2024/0406617 A1 Dec. 5, 2024

(30) Foreign Application Priority Data

Sep. 8, 2021 (IN) ............................ 202121040755

(51) Int. Cl.
*H04R 1/28* (2006.01)
*H04R 1/26* (2006.01)

(52) U.S. Cl.
CPC ............ *H04R 1/2888* (2013.01); *H04R 1/26* (2013.01); *H04R 2201/029* (2013.01); *H04R 2201/107* (2013.01)

(58) Field of Classification Search
CPC ...... H04R 1/1008; H04R 1/1075; H04R 1/26; H04R 1/2811; H04R 1/2888;
(Continued)

(56) References Cited

U.S. PATENT DOCUMENTS 6,263,085 B1 * 7/2001 Weffer ................ H04R 1/1075 381/186
6,356,644 B1 * 3/2002 Pollak ................. H04R 1/1075 181/129

(Continued)

FOREIGN PATENT DOCUMENTS

CN 102075827 A 5/2011

OTHER PUBLICATIONS

International Search Report issued Jul. 12, 2022 in PCT/IN2022/050804.
Written Opinion issued Jul. 12, 2022 in PCT/IN2022/050804.

*Primary Examiner* — Jeremy A Luks
(74) *Attorney, Agent, or Firm* — S.J. INTELLECTUAL PROPERTY LTD.

(57) ABSTRACT

The audio apparatus includes a base having a plurality of peripheral walls to define a housing. A partition is formed within the housing to define a first chamber and a second chamber. A spacing element is disposed within the first chamber and a first aperture is defined on one of the plurality of peripheral walls and facilitates air to enter the first portion. Each of a second aperture and a third aperture is defined on one of the plurality of peripheral walls. A woofer is mounted on the spacing element at a first position, the first position in combination with the first and the second apertures facilitate the woofer to direct first sound waves towards
(Continued)

an Ear Entrance Point (EEP). Further, a tweeter mounted at a second position in combination with the third aperture facilitate the tweeter to direct second sound waves towards the EEP.

12 Claims, 11 Drawing Sheets

(58) Field of Classification Search
CPC ........ H04R 2201/029; H04R 2201/105; H04R 2201/107
USPC .......................... 381/182, 370, 371; 181/199
See application file for complete search history.

(56) References Cited

U.S. PATENT DOCUMENTS

| | | | | |
|---|---|---|---|---|
| 7,155,025 | B1 * | 12/2006 | Weffer | H04R 5/033<br>381/384 |
| 7,340,071 | B2 * | 3/2008 | Huang | H04R 5/033<br>381/371 |
| 8,660,289 | B2 | 2/2014 | Tiscareno | |
| 2014/0205131 | A1 * | 7/2014 | Azmi | H04R 1/1066<br>381/380 |
| 2020/0389714 | A1 | 12/2020 | Roche et al. | |
| 2022/0109933 | A1 * | 4/2022 | Schmidt | H04S 7/304 |
| 2022/0394387 | A1 * | 12/2022 | Thune | H04R 5/0335 |

* cited by examiner

AUDIO APPARATUS AND A HEAD MOUNTED DEVICE INCLUDING THE AUDIO APPARATUS

FIELD OF THE INVENTION

The present invention relates to an audio apparatus, and more particularly relates to a head mounted device including the audio apparatus.

BACKGROUND OF THE INVENTION

In the present age, people are very busy with day-to-day activities such as work, house-keeping, travelling, family time, entertainment, etc. Therefore, people prefer multi-tasking. For example, when a person is travelling to work, he/she may prefer to simultaneously talk to other people or listen to music or watch movies. People talk to other people or listen to music or watch movies usually using their handheld mobile devices connected to a wired or wireless earphones connected to the mobile devices.

Further, many people due to climatic conditions would prefer wearing sunglasses. Also, people with an eye power are required to wear power glasses. Often people wearing these kinds of glasses find that plugging in earphones interferes with the stems of the glasses, thereby not providing the preferred audio experience. Also, due to the interference caused by the stem of the glasses while plugging on the earphones, the audio modules present within these earphones may not properly direct the sound waves from these audio devices to the ear, thereby allowing an overlap of the external environmental noise with sound waves, thereby further reducing the audio experience of the user. There have also been studies conducted that indicate frequent usage of earphones over a period of time can cause Cochlear Damage.

Further, when the existing audio modules are integrated to mixed reality and augmented reality systems and devices, there may be a lag in audio mimicking when the digital objects interact with the real-world environment, thereby not providing the preferred audio experience. Further, even the privacy of the audio experience of the user is compromised when the existing audio modules are integrated to the mixed and augmented reality systems and devices.

In view of the above, there is a dire need for a head mounted device and an audio apparatus, thereby ensuring an efficient audio experience and privacy for the user.

SUMMARY OF THE INVENTION

One or more embodiments of the present invention, provides an audio apparatus and a head mounted device including the audio apparatus.

In one aspect of the invention, an audio apparatus is provided. The audio apparatus comprises a base having a plurality of peripheral walls extending upwards at an offset from a longitudinal axis of the base to define a housing, and a partition formed within the housing extending upwards from the base to thereby define a first chamber and a second chamber within the housing. At least one spacing element is disposed within the first chamber of the housing thereby partitioning the first chamber into a first portion and a second portion. At least a first aperture is defined on one of the plurality of peripheral walls defining the first chamber and facilitating air to enter the first portion of the first chamber. At least a second aperture is defined on one of the plurality of peripheral walls defining the first chamber and the second portion and opposite to the peripheral wall defining the first aperture. At least a third aperture is defined on one of the plurality of peripheral walls defining the second chamber of the housing. At least one woofer is mounted on the at least one spacing element at a first position of the second portion of the first chamber. The first position in combination with the first and the second apertures facilitate the at least one woofer to direct first sound waves generated therein towards an Ear Entrance Point (EEP) of a user along a woofer acoustic axis. At least one tweeter is mounted at a second position within the second chamber, the second position in combination with the third aperture facilitate the at least one tweeter to direct second sound waves generated therein towards the EEP of the user along a tweeter acoustic axis and a cover adapted to engage with the peripheral walls of the housing, thereby forming a hermetically sealed enclosure.

In yet another aspect of the invention, a head mounted device is provided. The head mounted device comprises at least one stem including a first end and a second end. The first end of the stem is in proximate distance from an ear of a user and the second end protruding towards a face of the user. An audio apparatus is embedded within a hollow space of the at least one stem, wherein the hollow space is defined between the first end and the second end of the stem based on an optimal distance from an ear entrance point (EEP) of the user. The audio apparatus comprises a base having a plurality of peripheral walls extending upwards at an offset from a longitudinal axis of the base to define a housing, and a partition formed within the housing extending upwards from the base to thereby define a first chamber and a second chamber within the housing. At least one spacing element is disposed within the first chamber of the housing thereby partitioning the first chamber into a first portion and a second portion. At least a first aperture is defined on one of the plurality of peripheral walls defining the first chamber and facilitating air to enter the first portion of the first chamber. At least a second aperture is defined on one of the plurality of peripheral walls defining the first chamber and the second portion and opposite to the peripheral wall defining the first aperture. At least a third aperture is defined on one of the plurality of peripheral walls defining the second chamber of the housing. At least one woofer is mounted on the at least one spacing element at a first position of the second portion of the first chamber. The first position in combination with the first and the second apertures facilitate the at least one woofer to direct first sound waves generated therein towards an Ear Entrance Point (EEP) of a user along a woofer acoustic axis. At least one tweeter is mounted at a second position within the second chamber, the second position in combination with the third aperture facilitate the at least one tweeter to direct second sound waves generated therein towards the EEP of the user along a tweeter acoustic axis and a cover adapted to engage with the peripheral walls of the housing, thereby forming a hermetically sealed enclosure.

In yet another aspect of the invention, a method for assembling an audio apparatus is provided, the method comprises the steps of: providing, a base having a plurality of peripheral walls extending upwards at an offset from a longitudinal axis of the base to define a housing, forming, a partition within the housing, the partition extending upwards from the base to thereby define a first chamber and a second chamber within the housing; disposing, at least one spacing element within the first chamber of the housing such that the first chamber is partitioned into a first portion and a second portion; defining, at least one first aperture on one of the plurality of peripheral walls defining the first chamber and facilitating air to enter the first portion of the first chamber;

defining, at least one second aperture on one of the plurality of peripheral walls defining the first chamber and the second portion and opposite to the peripheral wall defining the first aperture; defining, at least a third aperture on one of the plurality of peripheral walls defining the second chamber of the housing; mounting, at least one woofer on the at least one spacing element at a first position of the second portion of the first chamber, wherein the first position in combination with the first and the second apertures facilitate the at least one woofer to direct first sound waves generated therein towards an Ear Entrance Point (EEP) of a user along a woofer acoustic axis; mounting, at least one tweeter at a second position within the second chamber, wherein the second position in combination with the third aperture facilitate the at least one tweeter to direct second sound waves generated therein towards the EEP of the user along a tweeter acoustic axis; and coupling, a cover to the peripheral walls of the housing, the cover adapted to engage with the peripheral walls of the housing, thereby forming a hermetically sealed enclosure.

Other features and aspects of this invention will be apparent from the following description and the accompanying drawings. The features and advantages described in this summary and in the following detailed description are not all-inclusive, and particularly, many additional features and advantages will be apparent to one of ordinary skill in the relevant art, in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

Reference will be made to embodiments of the invention, examples of which may be illustrated in the accompanying figures. These figures are intended to be illustrative, not limiting. The accompanying figures, which are incorporated in and constitute a part of the specification, are illustrative of one or more embodiments of the disclosed subject matter and together with the description explain various embodiments of the disclosed subject matter and are intended to be illustrative. Further, the accompanying figures have not necessarily been drawn to scale, and any values or dimensions in the accompanying figures are for illustration purposes only and may or may not represent actual or preferred values or dimensions. Although the invention is generally described in the context of these embodiments, it should be understood that it is not intended to limit the scope of the invention to these particular embodiments.

DETAILED DESCRIPTION OF THE INVENTION

Reference will now be made in detail to specific embodiments or features, examples of which are illustrated in the accompanying drawings. Wherever possible, corresponding or similar reference numbers will be used throughout the drawings to refer to the same or corresponding parts. References to various elements described herein, are made collectively or individually when there may be more than one element of the same type. However, such references are merely exemplary in nature. It may be noted that any reference to elements in the singular may also be construed to relate to the plural and vice-versa without limiting the scope of the invention to the exact number or type of such elements unless set forth explicitly in the appended claims. Moreover, relational terms such as first and second, and the like, may be used to distinguish one entity from the other, without necessarily implying any actual relationship or between such entities.

Various embodiments of the invention provide an audio apparatus. The present invention is configured to provide the audio apparatus and a head mounted device including the audio apparatus, thereby ensuring an efficient audio experience and privacy for the user. The present invention can be utilized in fields such as, but not limited to, music and/or, telecom, virtual reality, mixed reality and augmented reality.

Figure 1:
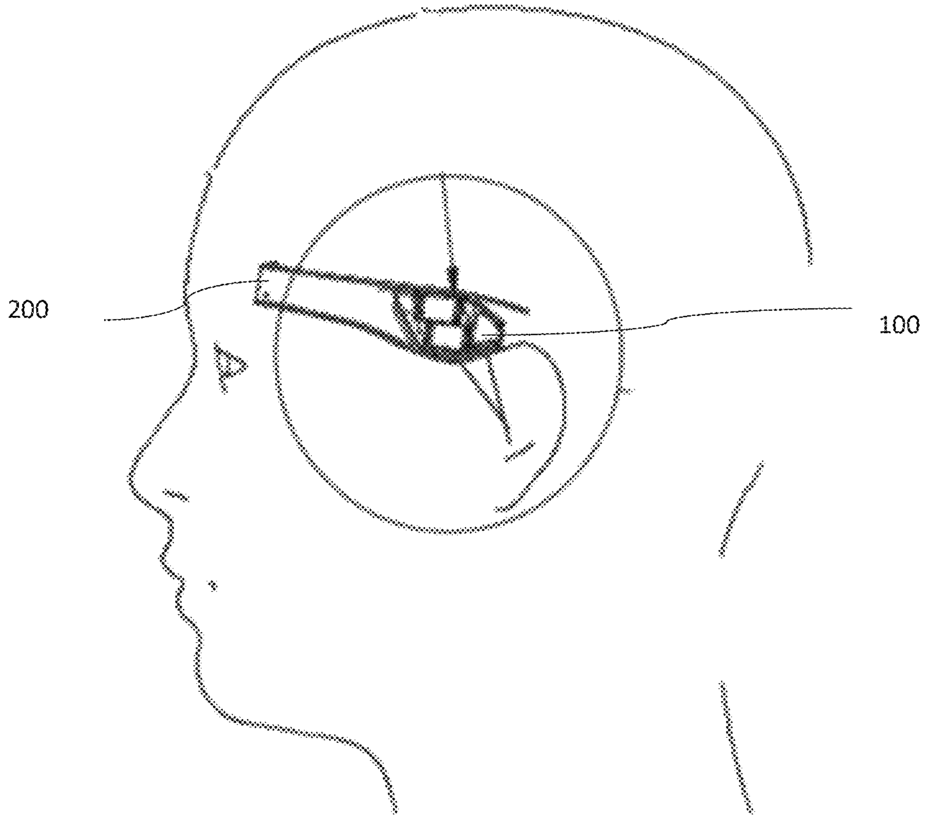
FIG. 1 is an environment for a head mounted device, according to one or more embodiments of the present invention.

FIG. 1 illustrates an example environment for an audio apparatus 100 and a head mounted device 200 including the audio apparatus 100, according to one or more embodiments of the present invention. In the present example of FIG. 1, the audio apparatus 100 is embedded within the head mounted device 200.

In an alternate embodiment, the audio apparatus 100 is coupled to the head mounted device 200 instead of being embedded. In this regard, it is to be noted that the scope of the present disclosure is not only limited to the audio apparatus 100 being embedded within the head mounted device 200.

In another alternate embodiment, the audio apparatus 100 is wearable on an external surface of a human being. In this regard, it is to be noted that, the audio apparatus 100 is explained in relation to the head mounted device only for the purpose of description and should nowhere be construed as limiting the scope of the present disclosure.

In an embodiment, the head mounted device 200 is coupled to at least one of, but not limited to, a viewing lens. The viewing lens integrated with the head mounted device including the audio apparatus and a plurality of video modules pertaining to Virtual Reality (VR)/Mixed Reality (MR)/Augmented Reality (AR) are configured to provide an immersive experience to a user in the VR/MR/AR field.

From hereinafter, the audio apparatus 100 will be illustrated with reference to FIG. 2 which is an exploded view of the audio apparatus 100 and in combination with other figures in order to clearly define the various components of the audio apparatus 100.

Figure 2:
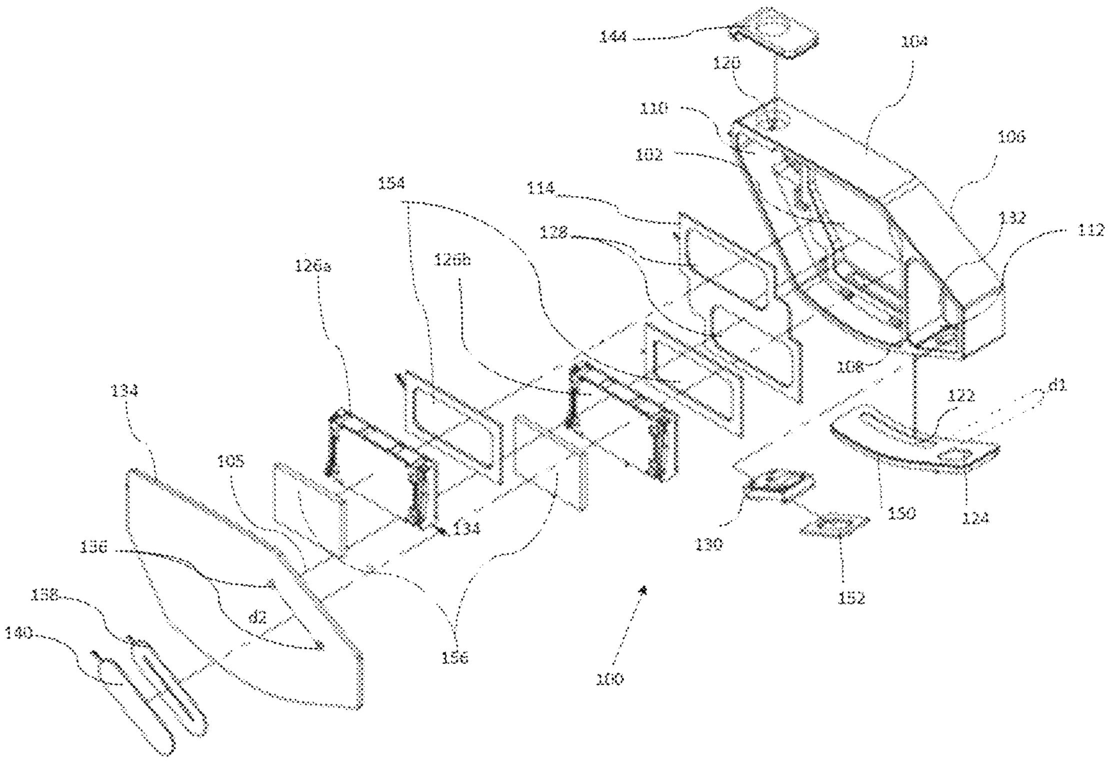
FIG. 2 illustrates an exploded view of an audio apparatus along a longitudinal axis, according to one or more embodiments of the present invention.
Figure 3A:
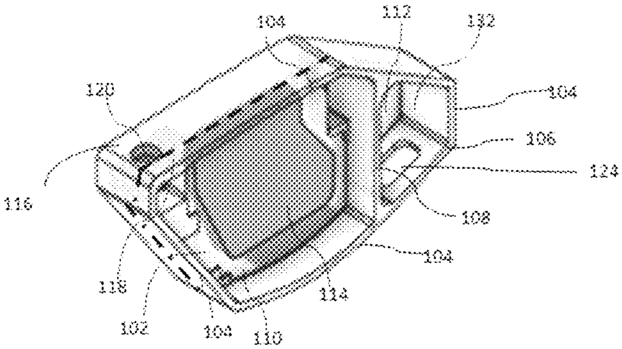
FIG. 3A and FIG. 3B illustrate perspective view and side perspective view of a housing of an audio apparatus, according to one or more embodiments of the present invention.

The audio apparatus 100 includes a base 102 having a plurality of peripheral walls 104 extending upwards at an offset from a longitudinal axis of the base 102 to define a housing 106 as shown in FIG. 2 and FIG. 3A.

In accordance with an embodiment of the present invention, each of the plurality of peripheral walls 104 is coupled to the base 102 of the housing 106 by means such as, but not limited to, fasteners, welding, etc.

In an alternate embodiment, each of the plurality of peripheral walls 104 are formed with the base 102 by means such as, but not limited to, molding.

With reference to FIG. 3A, the audio apparatus 100 includes four peripheral walls 104. FIG. 3A should only be considered for explanation and as an example and should nowhere be construed as limiting the scope of the present invention to just four peripheral walls, as there may be less or more than four peripheral walls 104 to the audio apparatus 100 based on the design of the audio apparatus 100.

In an embodiment, the design of the audio apparatus 100 may vary depending on the design of the head mounted device 200 in which the audio apparatus 100 may be embedded.

Further, a partition 108 is formed within the housing 106 of the audio apparatus 100 extending upwards from the base 102 to thereby define a first chamber 110 and a second chamber 112 within the housing 106.

In an embodiment, the partition 108 is a partition wall as shown in FIGS. 2 and 3A formed from the base 102 by means such as, but not to, molding and coupling a partition wall to the base 102 of the housing 106 by means such as but not limited to, fasteners and welding.

In an alternate embodiment, at least two partition walls are formed from the base 102 to define the first chamber 110 and the second chamber 112, respectively, thereby defining a gap between the first chamber 110 and the second chamber 112.

At least one spacing element 114 is disposed in the first chamber 110 of the housing 106 along the longitudinal axis as shown in FIGS. 2 and 3A. In accordance with an embodiment of the invention, the spacing element 114 is disposed in the first chamber 110 of the housing 106, thereby partitioning the first chamber 110 into a first portion 116 and a second portion 118 as shown in FIG. 3A. Advantageously ensuring a hermetic sealing is formed between the first portion 116 and the second portion 118.

In an embodiment, the first portion 116 of the housing is in close proximate distance to the base 102 of the housing 106 and the second portion 118 is distal from the base 102 of the housing 106.

In an embodiment, the spacing element 114 is at least one of, a metal baffle. The metal baffle is preferred over other spacing elements 114 in order to prevent deformation of the spacing element 114.

In an alternate embodiment, multiple spacing elements may be disposed within the first chamber 110, thereby partitioning the first chamber 110 into multiple portions.

In accordance with an embodiment of the invention, at least a first aperture 120 is defined on one of the plurality of peripheral walls 104. The at least first aperture 120 is adapted to facilitate air to enter the first portion 116 of the first chamber 110 of the housing 106 as shown in FIG. 3A.

At least a second aperture 122 is defined on one of the plurality of peripheral walls 104 defining the first chamber 110 and the second portion 118 as shown in FIG. 3A. The peripheral wall 104 on which the at least second aperture 122 is defined is opposite to the peripheral wall 104 on which the at least first aperture 120 is defined.

In an alternate embodiment, instead of the at least first aperture 120, there may be a set of multiple first apertures defined on one of the peripheral walls 104 of the housing. Further, instead of the at least second aperture 122, there may be a set of multiple second apertures defined on one of the peripheral wall 104 opposite to the peripheral wall 104 on which the set of multiple first apertures are defined.

Figure 3B:
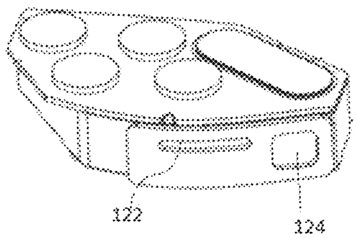

In accordance with an embodiment of the present invention, the housing 106 is not limited to the current shape as explained in FIG. 2, FIG. 3A and FIG. 3B. The housing 106 may have various shapes such as, but not limited to, square, rectangle, triangle, rhombus, etc.

The audio apparatus 100 as shown in FIG. 2 further includes at least a third aperture 124, according to an embodiment of the invention. The third aperture 124 is defined on one of the plurality of peripheral walls 104 defining the second chamber 112 of the housing 106.

In accordance with an embodiment of the invention, the second and the third apertures are defined at a predetermined distance (d1) from each other to eliminate crossover frequency as shown in FIG. 2. In a preferred embodiment, the predetermined distance between the second and the third apertures is at least 5 mm to eliminate a crossover frequency of 3 Khz and above between the at least one woofer and the at least one tweeter.

At least one woofer 126 is mounted on the at least one spacing element 114 at a first position 128 of the second portion 118 of the first chamber 110 as shown in FIG. 2.

In accordance with an embodiment of the invention, the at least one woofer 126 is mounted on the spacing element 114 via a gasket woofer 154. In a preferred embodiment, two woofers 126 are mounted on the at least one spacing element 114, wherein each of the two woofers 126 is mounted at the first position 128 of the spacing element 114. As shown in FIG. 2, the spacing element 114 includes two of the first positions 128.

It is well known in the art that the woofer 126 is adapted to generate sound waves in the range of 50 Hz to 3000 Hz.

In the present invention, the sound waves generated by the at least one woofer 126 is hereinafter being termed as first sound waves.

In accordance with an embodiment of the invention, the at least one woofer 126 is at least one of, but not limited to, a flat coil Electrodynamic driver, pressure actuators.

In terms of working of the at least one woofer in the present invention, the at least one woofer 126 which is mounted on the spacing element 114 in the second portion 118 generates acoustic vibrations in response to receiving electric signals from a signal generator and sucking in air from an external environment from the first aperture 120. Due to the acoustic vibrations generated, the first sound waves are emitted from the first portion 116 to the second portion 118 of the first chamber 110 through vibration channels created there-though. It is required to be noted that that the vibration flow channels are not physical channels but are channels formed for emitting the sound waves. In an embodiment, the first sound waves in the first portion 116 are positive in nature, in other words is non-inverted and the first sound waves emitted in the second portion 118 of the first chamber 110 are negative in nature, in other words inverted. Therefore, the interference of the positive waves and the negative waves based on the first sound waves generated by the at least one woofer 126 may cause cancellation of these waves, thereby the audio apparatus 100 may not be efficient. Therefore, to reduce cancellation of the positive and the negative waves, the audio apparatus 100 is designed based on at least one of, but not limited to a Helmholtz resonator technique. The Helmholtz resonator technique is based on a Helmholtz resonance formula. In an embodiment, the Helmholtz resonator technique is utilized to ensure the at least one woofer 126 emits acoustic vibrations of a specific frequency in the first portion 116 and the second portion 118 of the first chamber 110. Advantageously, ensuring the first sound waves are not cancelled because of interference of the positive and the negative waves and further ensuring that efficient sound is transmitted to the user.

Figure 4:
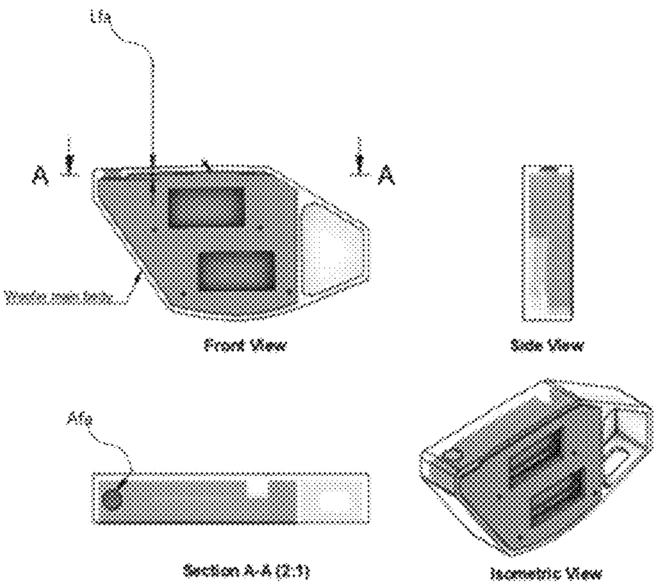
FIG. 4 illustrates a plurality of views of an audio apparatus in order to determine a specific frequency at which at least one woofer vibrates at a first portion of a first chamber, according to one or more embodiments of the present invention.

In an embodiment, the Helmholtz resonator formula applied to the first portion 116 of the first chamber 110 of the housing 106 of the audio apparatus 100 is illustrated below with reference to FIG. 4.

$$F_{fp}=V_{fa}/2\pi\sqrt{(A_{fa}/(V_{fc}*L_{fa}))},\text{ where}$$

$F_{fp}$—specific frequency range at which the at least one woofer 126 vibrates at the first portion (fp) 116 of the first chamber 110;

$V_{fp}$—velocity of the first sound waves generated at the first portion 116;

$A_{fa}$—cross section area of the first aperture 120;

$V_{bc}$—volume of back cavity of the at least one woofer 126, the back cavity being the surface which is mounted on to the at least one spacing element; and $L_{fa}$—length of the first aperture;

Based on the above Helmholtz resonator formula, a desired $F_{fp}$—which is the frequency at which the at least one woofer 126 vibrates at the first portion of the first chamber 110 is obtained based on building the audio apparatus 100 including specific configurations pertaining to the at least one woofer 126, which includes $A_{fa}$—cross section area of the first aperture $A_{fa}$, $V_{bc}$—volume of back cavity of the at least one woofer 126, the back cavity being the surface which is mounted on to the at least one spacing element and $L_{fa}$—length of the first aperture 120.

For example, let us consider that the $V_{bc}$ is 8.566E cubic meters, $A_{fa}$ is 0.00000491 square meters, $L_{fa}$ is 0.001156 meters and $V_{fp}$ is 343.4 metres/second. Based on this data, the $F_{fp}$ is 3.848. Therefore, based on the above, the frequency ($F_{fp}$) at which the woofer vibrates at the first portion can be adjusted as desired.

Figure 5:
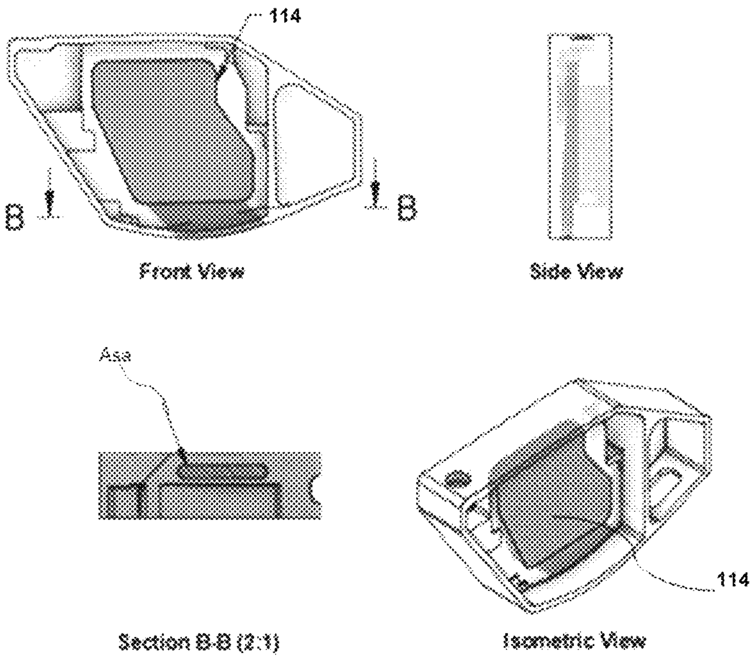
FIG. 5 illustrates a plurality of views of an audio apparatus in order to determine a specific frequency at which at least one woofer vibrates at a second portion, according to one or more embodiments of the present invention.

Similarly, the Helmholtz resonator formula applied to the second portion 118 of the first chamber 110 of the housing 106 of the audio apparatus 100 is illustrated below with reference to FIG. 5.

$$F_{sp}=V_{sa}/2\times\sqrt{(A_{sa}/(V_{bc}*L_{sa}))},\text{ where}$$

$F_{sp}$—specific frequency at which the at least one woofer 126 vibrates at the second portion (sp) of the first chamber 110;

$V_{sp}$—velocity of the first sound waves at the second portion 118;

$A_{sa}$—cross section area of the second aperture 122;

$V_{fc}$—volume of front cavity of the at least one woofer 126 is the volume of the woofer which is opposite to the back cavity of the woofer surface which is mounted to the at least one spacing element 114; and $L_{sa}$—length of the second aperture 120;

Based on the above Helmholtz resonator formula, a desired $F_{sp}$—which is the frequency at which the at least one woofer 126 vibrates at the second portion 118 of the first chamber 110 is obtained based on building the audio apparatus 100 including specific configurations pertaining to the at least one woofer 126, which includes $A_{sa}$—cross section area of the second aperture 122, $V_{fc}$—volume of front cavity of the at least one woofer 126 is the volume of the woofer which is opposite to the back cavity of the woofer surface which is mounted to the at least one spacing element 114 and $L_{sa}$—length of the second aperture 122.

For example, let us consider that the $V_{fc}$ is 3.30398 cubic meters, $A_{sa}$ is 0.000012632 square meters, $L_{sa}$ is 0.00465 meters and $V_{sp}$ is 343.4 meters/second. Based on this data, the $F_{sp}$ is 4.956. Therefore, based on the above, the frequency ($F_{sp}$) at which the woofer 126 vibrates at the second portion 118 can be adjusted based on desired range. It can be observed that the front cavity of the at least one woofer 126 is more voluminous to the back cavity of the at least one woofer 126.

In a preferred embodiment, the at least one woofer 126 is adapted to vibrate at the specific frequency range of at least 3-4 Khz at the first portion 116 of the first chamber 110. Similarly, the at least one woofer 126 is adapted to vibrate at the specific frequency range of at least 4-5 Khz at the second portion 118 of the first chamber 110. The at least one woofer 126 at the first portion 116 of the first chamber 110 and the at least one woofer 126 at the second portion 118 of the first chamber 110 are of equal strength but are configured to vibrate with an opposite phase. As a result, whilst the first aperture 120 pushes air out, the second aperture 122 pushes air in, and vice versa. Thus, the first aperture 120 and the second aperture 122 together function as a dipole source. While one source expands the other source contracts. It will be appreciated that a dipole source does not radiate sound in all directions equally. Moreover, a directivity pattern mimics a figure-8 pattern, wherein there are two regions where sound is radiated very well (namely, via the first aperture 120 and the second aperture 122), and two regions where sound cancels (namely, in direction normal to the EEP).

Advantageously, ensuring that the first sound waves generated by the at least one woofer are efficient and provide privacy to the user.

In accordance with an embodiment of the invention, the volume of the front cavity of the at least one woofer is gradually increased from the volume of the back cavity of the woofer in order to ensure the air pressure approaching the second aperture 122 doesn't create a resonator atmosphere in the second portion 118 of the first chamber. Further, the volume of the front cavity of the woofer is required to be as small as possible but keeping at least 1 mm offset from a woofer membrane in order to be freely movable.

It is to be noted that the present invention can utilize other techniques as well to ensure desirable specific frequency at which the at least one woofer is required to vibrate. Therefore, utilizing the present Helmholtz resonator formula should nowhere to be construed as limiting the scope of the present invention.

In an embodiment, the first sound waves generated by the at least one woofer 126 is directed out of the second aperture 122 as shown in FIG. 2 of the first chamber 110 of the housing 106.

In a preferred embodiment of the invention, at least two woofers 126 is mounted on the spacing element 114 as shown in FIG. 2. The at least two woofers 126 are equal to a pair of spherical sources of equal strength very close to each other and vibrating with an opposite phase. Due to phase cancellation, a destructive interference occurs resulting in cancellation of low frequencies. In this regard, the spacing element 114 is necessary for isolating acoustic vibrations generated in the first portion 116 wherein the at least two woofers 126 are mounted on the spacing element 114 from the second portion 118 of the first chamber 110 to compensate for low frequency cancellation.

Figure 6A:
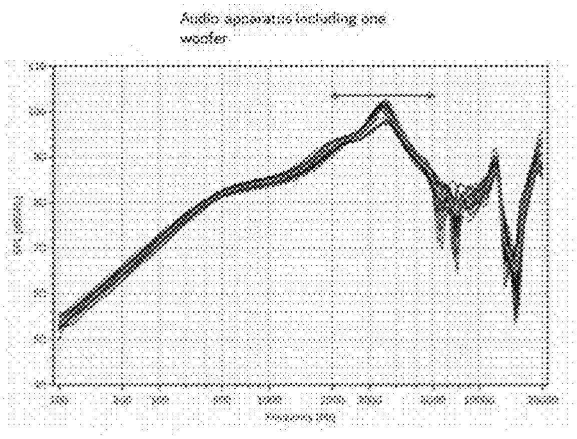
FIGS. 6A and 6B illustrate exemplary graphs of a frequency response curve for an audio apparatus including at least one woofer and two woofers, respectively, according to one or more embodiments of the present invention.
Figure 6B:
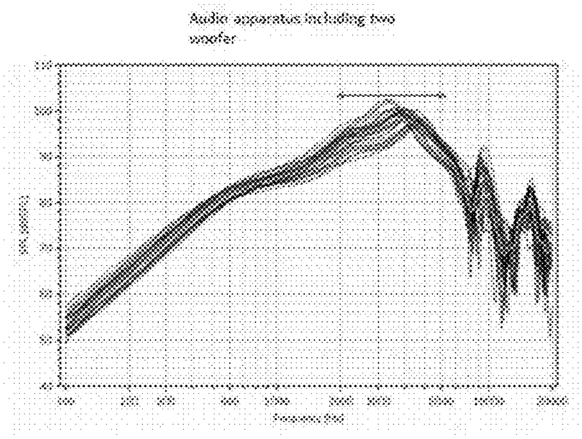

In accordance with an embodiment of the invention, usage of at least two woofers 126 facilitate in maintaining an overall audio gain of at least 15 db while compared to a similar enclosure configuration comprising of the at least one woofer 126 in the audio apparatus 100. FIG. 6A and FIG. 6B illustrate exemplary graphs of a frequency response curve for an audio apparatus 100 including at least one woofer 126 and two woofers 126, respectively which can provide a gain of at least 15 db. It is well known in the art that a frequency response curve is defined as the variation in sound pressure level as a function of frequency. In this regard, the X-axis includes frequency ranging from 0-20000 Hz and the Y-axis is the Sound pressure level in decibel (db). As per the graph, it is observed that the frequency response curves of a sine sweep don't have a smooth response between 2-6 khz for the audio apparatus 100 having one woofer 126 as shown in FIG. 6A, whereas the frequency curve is very smooth between 2-6 khz for the audio apparatus 100 with at least two woofers 126 as shown in FIG. 6B. Therefore, the smooth response created for the audio apparatus 100 with two woofers 126 facilitate in equalizing the frequency responses to a desired and optimized response for listening to high base music and catering to a large variety of high base music being reproduced in the woofer without affecting the original audio quality.

In a preferred embodiment, the spacing element 114 is required to be robust, so the at least two woofers 126 mounted thereon do not get deformed. Advantageously, the spacing element 114 ensures hermetic sealing between the first portion 116 and the second portion 118 of the first chamber 110 and also ensures manufacturing flexibility. Usage of the spacing element 114 ensures at least a 10 dB gain in lower frequencies as against the absence of the spacing element 114 in the first chamber 110.

In accordance with an embodiment of the invention, each of the at least two woofers 126, is mounted on the spacing element 114 at a first position 128 as shown in FIG. 2.

In accordance with an embodiment of the invention, at least one tweeter 130 is mounted at a second position 132 within the second chamber 112 of the housing 106. It is well known in the art that the tweeter 130 acts like a loudspeaker producing sound waves of high frequencies. From hereinafter, the sound waves generated by the at least one tweeter 130 will be termed as second sound waves.

In accordance with an embodiment of the invention, the at least one tweeter 130 is at least one of, but not limited to, a digital acoustic actuation device and the acoustic vibrations generated therein is by micromovements on a piezoelectric chip. Advantageously, the at least one tweeter 130 doesn't require a similar arrangement such as the first portion 116 and the second portion 118 of the first chamber 110 which acts like a resonator.

In accordance with an embodiment of the invention, the second sound waves generated by the tweeter 130 are emitted out of the housing 106 via the third aperture 124.

Figure 7:
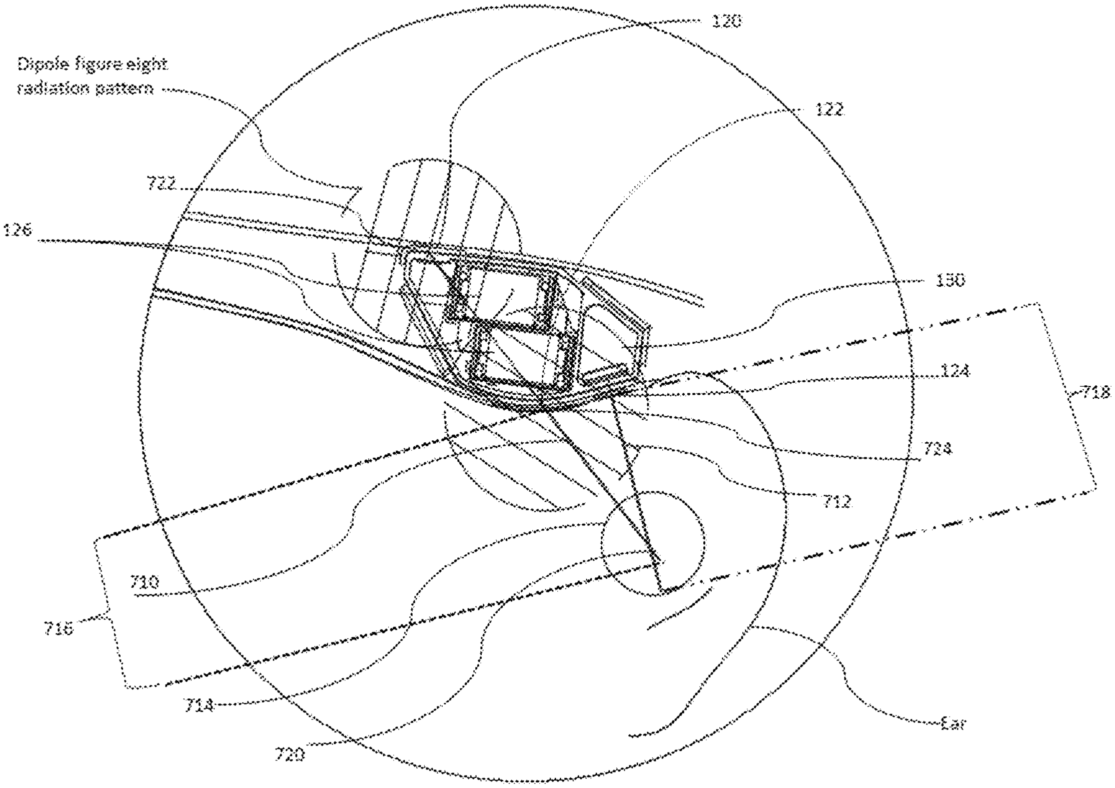
FIG. 7 illustrates a dipole figure eight radiation pattern within an audio apparatus, according to one or more embodiments of the present invention.
Figure 8:
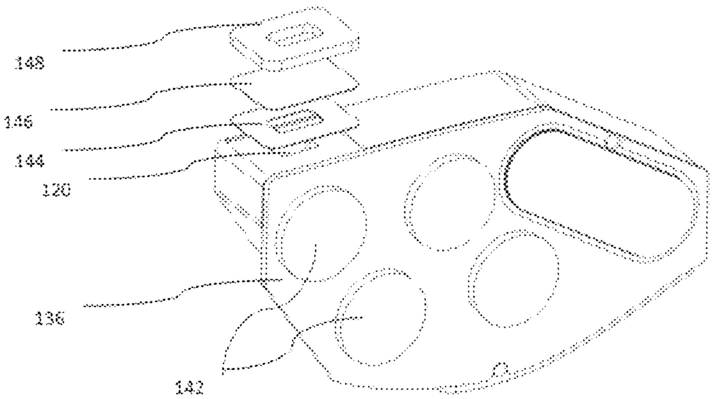
FIG. 8 illustrates a perspective view of au audio apparatus including one or more gaskets and meshes, in accordance with one or more embodiments of the present invention.

With reference to FIG. 7, the position of the first aperture 120, the second aperture 122 and the third aperture 124 on the respective peripheral walls 104 along with the first position 128 of the at least one woofer 126 and the second position 132 of the at least one tweeter 130 are determined based on at least one of, but not limited to, a dipole FIG. 8 radiation pattern technique. The dipole FIG. 8 radiation pattern achieved in the audio apparatus 100 allows for maximum of the first sound waves to be directed along the base 102 including the first aperture 120 and the second aperture 122 of the housing 106. In accordance with an embodiment of the invention, the woofer acoustic axis 710 is an axis which commences from a midpoint of the first aperture 120 and passes through a midpoint of the second aperture 122 and terminates at an Ear Entrance Point (EEP) 714 of the user or entrance of a concha of the user as shown in FIG. 7.

Further, a tweeter acoustic axis 712 is also formed which commences from the third aperture 124 and terminates at the EEP 714. The tweeter acoustic axis 712 is located normal to the tweeter plane as shown in FIG. 7.

In accordance with an embodiment of the invention, the EEP is a point including an area which is also a concha of the ear wherein the sound waves enter the ear and are directed through the ear canal. Therefore, the woofer acoustic axis 710 and the tweeter acoustic axis 712 terminating at the EEP indicates that these axes may either terminate at the tip of the circumference of the EEP or at a certain point through the EEP as shown in FIG. 7.

The dipole FIG. 8 radiation pattern substantially reduces (namely, minimizes) the strength of the sound waves escaping in the direction away from the EEP 714, thereby preventing leakage of sound and thus enabling audio privacy. Further, the tweeter is placed perpendicular to concha or the EEP with a distance less than 25 mm, so that the second sound waves of higher frequencies from the tweeter 130 are projected into the EEP 714 thereby minimising leakage of the second sound waves. Additionally, the dipole FIG. 8 radiation pattern positioning of the at least one or two woofers 126 on the first position 128 provide a tangential sound propagation that compliments the path created by the tweeter acoustic axis 712 as shown in FIG. 7. The dipole FIG. 8 radiation pattern achieved in direction normal to the EEP or the concha is destructive and thereby causes destructive interference lowering sound amplitude along the normal direction. To avoid this destructive interference, the distance between the second aperture 122 and the third aperture 124 is at least 5 mm so that there is no interference caused between the first sound waves and the second sound waves entering the EEP 714, thereby efficient base and treble coupling is achieved between the first sound waves and the second sound waves. Further, as per the dipole FIG. 8 radiation pattern technique, the second aperture 122 and the third aperture 124 have to be positioned in such a manner that a woofer EEP distance 716 and a tweeter EEP distance 718 should be at least in the range of 25 mm-30 mm. The woofer EEP distance 716 is the distance from the second aperture 122 to the EEP 714 along the woofer acoustic axis 710. Similarly, the tweeter EEP distance 718 is the distance from the third aperture 124 to the EEP 710 along the tweeter acoustic axis 712.

In accordance with an embodiment of the invention, the dipole FIG. 8 radiation pattern achieved in the audio apparatus 100 ensures that the at least one woofer 126 mounted on the at least one spacing element 114 at the first position 128 of the first portion 116 of the first chamber 110, wherein the first position 128 in combination with the first aperture 120 and the second aperture 122 facilitate the at least one woofer 126 to direct the first sound waves generated therein towards the Ear Entrance Point (EEP) 714 of the user along the woofer acoustic axis 710. Further, the first aperture and the second aperture should be positioned in such a manner that an intersection 720 of the woofer acoustic axis 710 and the tweeter acoustic axis 712 should be as close to the EEP or the concha of the user, advantageously ensuring sound efficiency.

In accordance with an embodiment of the invention, a cover 134 is adapted to engage with the peripheral walls 104 of the housing 106, thereby forming a hermitically sealed enclosure as shown in FIG. 3.

In an embodiment, the cover 134 is engaged with the housing 106 by interacting with a woofer gasket 156 as shown in FIG. 2.

In an embodiment, the cover 134 is a printed circuit board (PCB).

Further, as shown in FIG. 2, the cover 134 includes at least two openings 136, each of the two openings 136 is of a pre-determined diameter and separated by a pre-determined length (d2) from each other based on the distance between the at least one woofer 126 and the at least one tweeter 130. The at least two openings 136 regulate pressure between the at least one woofer 126 and the at least one tweeter 130 in response to the first and the second sound waves generated therein.

Each of the at least two openings 136 is set at the pre-determined diameter and the pre-determined distance from each other based on the Helmholtz resonator formula as illustrated below.

$f=v/2\pi\sqrt{(Acs/(V*L))}$, where v is Velocity of sound;

Acs is cross section area of at least one opening 136;

V is volume of cavity of the woofer;

L is equivalent length of the at least one opening 136;

Further, an adhesive such as, but not limited to, a pressure sensitive adhesive (PSA) 138 is applied on the two openings 136 as shown in FIG. 3. The PSA 138 forms a channel for air flow between the first chamber 110 and the second chamber 112 thereby regulating pressure, therein. Further, the PSA 138 is sealed using a sealant film 140 such as, but not limited to, Polyethylene terephthalate (PET) film.

As shown in FIG. 8, the cover 136 of the audio apparatus 100 is coupled to one or more housing gaskets 142. The housing gaskets 142 enable the audio apparatus 100 to be coupled to any other mating surfaces.

Further, as shown in FIG. 8, an outer surface of the first aperture 120 includes a first aperture mesh 144. The first aperture mesh 144 is provided thereon to provide ingress protection. In an embodiment, the first aperture mesh 144 is formed of a customized monofilament fiber which has a structure of a high precise micro pattern repeatability with nanofibers spread evenly within the first aperture mesh 144 area. Advantageously, ensuring the dust and other particles are blocked but sound level remains the same.

A first gasket 146 is mounted on the first aperture mesh 144. The first gasket 146 is adapted to form a hermetic sealing between the first aperture mesh 144 and the sound apparatus 100.

Further, a second gasket 148 is mounted on the first gasket 146. The second gasket 148 is adapted to compresses at least 60%, thereby blocking dust and other particles from entering the first aperture 120.

As shown in FIG. 3, a second aperture mesh 150 is coupled to an outer surface of the second aperture 122 to provide ingress protection. The second aperture mesh 150 similar to the first aperture mesh 144 is formed of a customized monofilament fiber which has a structure of a high precise micro pattern repeatability with nanofibers spread evenly within the first aperture mesh 144 area. Advantageously, ensuring the dust and other particles are blocked but sound level remains the same. Similar to the first aperture mesh 144, the second aperture mesh 150 can also include the first gasket 146 and the second gasket 148 like arrangement to provide ingress protection.

Further, a third aperture mesh 152 is coupled to an outer surface of the third aperture 124 to provide ingress protection. The third aperture mesh 152 similar to the first aperture mesh 144 and the second aperture mesh 150 is formed of a customized monofilament fiber which has a structure of a high precise micro pattern repeatability with nanofibers spread evenly within the first aperture mesh 144 area. Advantageously, ensuring the dust and other particles are blocked but sound level remains the same. Similar to the first and second aperture meshes 144 150, the third aperture mesh 152 can also include the first gasket 146 and the second gasket 148 like arrangement to provide ingress protection.

Figure 9:
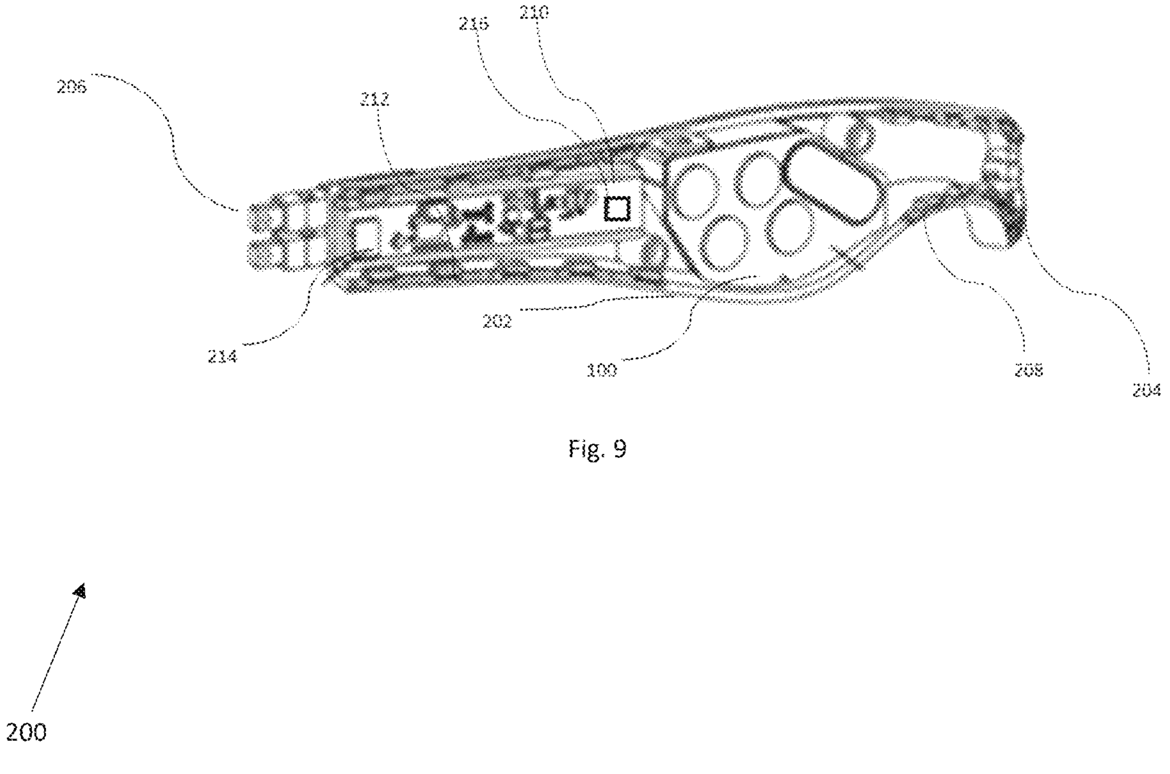
FIG. 9 illustrates an example of a head mounted device including an audio apparatus, according to one or more embodiments of the present invention.

FIG. 9 illustrates the head mounted device 200 including the audio apparatus 100. As shown in the figure, the head mounted device 200 includes at least one stem 202. The at least one stem 202 includes a first end 204 and a second end 206. The first end 204 of the stem is in proximate distance from the ear of the user and the second end 206 protruding towards a face of the user. Further, a head mounting portion 208 of the head mounted device 200 rests on the ear of the user. The mounting portion 208 is designed in such a manner such that the load of the mounting device 200 rests on the ear without putting pressure on the ear. Further, the mounting portion 208 may be customized to suit different users based on their shape of the ear.

In alternate embodiments, the head mounting device 200 may be mounted to various parts of the body of the user such as, but not limited to, forehead.

In a preferred embodiment, the head mounted device 200 includes the at least one stem 202 and a second stem. Each of these stems 202 of the head mounted device 200 is adapted to be in proximate distance from each ear of the user.

The audio apparatus 100 preferably in the shape of the ear is embedded within a hollow space of the at least one stem 202, wherein the hollow space is defined between the first end 204 and the second end 206 of the stem 202. As seen in FIG. 9, the audio apparatus 100 is in the shape of a mango, since the ear resembles a mango. However, this shape of the audio apparatus 100 should not be construed as limiting the scope of the present invention just to this shape.

Further, the hollow space is defined based on an optimal distance from the ear entrance point (EEP) 714 of the user. Further, the audio apparatus 100 is embedded within the at least one stem 202 such that the woofer acoustic axis 710 and the tweeter acoustic axis 712 are directed towards the EEP 710 as shown in FIG. 7.

As shown in FIG. 9, the audio apparatus 100 is embedded within the hollow space of the at least one stem 202 such that the audio apparatus 100 rests on one of the peripheral walls 104 that includes the second aperture 122 and the third aperture 124. Further, the first aperture 120 of the audio apparatus 100 rests on the peripheral wall 104 opposite to the peripheral wall 104 including the second aperture 122 and the third aperture 124. In this regard, the first and the second sound waves are emitted out from the second aperture and the third aperture to the EEP of the user.

In a preferred embodiment, the head mounted device 200 which includes the at least one stem 202 and the second stem, wherein each of the at least one stem 202 and the second stem includes the audio apparatus 100.

In a preferred embodiment, the audio apparatus 100 is embedded within the stem 202 of the head mounted device 200 such that the second aperture 122 and the third aperture 124 are in proximate distance to the EEP compared to the first aperture 120, in order to ensure the first and the second sound waves enter the EEP at a quick pace. Further, the first aperture 120 which is positioned on the peripheral wall 104 opposite to the peripheral wall 104 on which second aperture 122 is positioned is distal from the EEP of the user in order to ensure the air from the environment is sucked into the audio apparatus 100.

In an embodiment, the optimal distance between the audio apparatus 100 and the EEP 714 is determined as the shortest woofer EEP distance 716 and the shortest tweeter EEP distance 718, wherein the at least one woofer 126 and the at least one tweeter 130 are placed within the audio apparatus 100 as indicated above.

In an embodiment, the woofer EEP distance and the tweeter EEP distance should be in the range of 25-30 mm.

Further, the at least one stem 202 of the head mounted device 200 is designed such that it matches the approximate geometry of a concha of the ear, thus enabling the sound waves from the audio apparatus 100 to bounce within the acoustic meatus (ear canal) improving the sound travel efficiency. In contrary, if the audio apparatus 100 is placed in a perpendicular direction, this results in the sound waves travelling in an alternate path to the ear canal where the sound leaks compromising the audio efficiency and listening privacy.

In an embodiment, the position of the first aperture 120 on the peripheral wall 104 and the position of the second aperture 122 on the opposite peripheral wall 104 are based on parameters including a combination of at least the dipole FIG. 8 radiation pattern as discussed above, the first position 128 on which the at least one woofer 126 is mounted, the geometry of the stem 202 and the geometry of the concha of the ear. Taking all these parameters into consideration, the first aperture 120 and the second aperture 122 are positioned on the respective peripheral walls 104 in order to direct the first sound waves to the EEP along the woofer acoustic axis 710 and also to form the intersection 720 with the tweeter acoustic axis 712. To provide an example with reference to FIG. 7, the first aperture 120 is positioned at a proximate distance to a first end of the peripheral wall 104. Similarly, the second aperture 122 is positioned at a proximal distance to a second end of the peripheral wall 104 opposite to the peripheral wall having the first aperture 120. In case the first aperture 120 and the second aperture 122 were positioned opposite to each other, then the woofer acoustic axis 710 would not form the intersection 720 with the tweeter acoustic axis 712. The intersection 720 is essential in order for efficient bass and treble to pass through the EEP.

Further as discussed above, the position of the first position 128 of the at least one woofer 126 is also essential in order to ensure that the first sound waves which are generated are directed maximum along the base 102 and the second aperture 122 thereby ensuring maximum of the first sound waves to pass through the second aperture 122 and directed to the EEP. With reference to FIG. 7 which includes two woofers 126 which are positioned at the first position 128, ensure that the maximum of the first sound waves generated therein are directed to the EEP through the second aperture 122.

Further, parameters such as the geometry of the stem 202 of the head mounted device 200 and the geometry of the concha of the ear of the user are also essential in order to position the first aperture 120 and the second aperture 122 on the respective peripheral walls 104. For example, with reference to FIGS. 7 and 9, if the head mounted device 200 having the mounting portion 208, has the audio apparatus 100 embedded to the far left or far right of the stem 202 and the geometry of the concha is large compared to other users, then the position of the first aperture 120 and the second aperture 122 on the respective peripheral walls 104 may have to be altered in order to ensure the woofer acoustic axis 710 and the tweeter acoustic axis 712 form the intersection 720 at the EEP.

As seen in FIG. 9, the audio apparatus 100 is coupled to transducer electronics assembly 210. The transducer electronics assembly 210 includes the signal generator 212 and a microphone 214 including a microphone sensor. The transducer assembly 210 is coupled to the audio apparatus 100 by means such as, but not limited to, solder pads.

With reference to FIG. 9, the microphone 214 is positioned within the transducer assembly 210 at a proximal distance from the second end 206 of the stem 202, thereby advantageously ensuring the sound waves generated by the audio apparatus 100 do not interfere with the microphone sensor placed, thereby reducing echo effect in conference calls, reducing aural cognitive fatigue, and also reducing stray background noise, such that it does not hinder focus within the augmented, virtual, mixed reality experience.

In accordance with an embodiment of the invention, the second end 206 of the at least one stem 202 of the head mounted device 200 may be coupled to a viewing lens. The viewing lens in combination with the head mounted device 200 including the audio apparatus 100 may be utilized in the augmented, virtual and mixed reality experience to view and listen to digital video and audio content.

In accordance with an embodiment of the invention, the head mounted device 200 includes a controller 216 within the transducer electronics assembly 210.

The controller 216 explained hereinafter, may be implemented as one or more microprocessors, microcomputers, microcontrollers, digital signal processors, central processing units, state machines, logic circuitries, and/or any devices that manipulate signals based on operational instructions. Among other capabilities, the controller 216 is configured to fetch and execute computer-readable instructions stored in the memory in order to enhance the augmented reality (AR)/mixed reality (MR)/virtual reality (VR) experience. For example, in the MR field, since there is an interaction between the digital objects with real-world environment, determining the location of the sound source and the direction the sound waves are travelling from the sound source may be difficult. For example, let us consider that the user is wearing the head mounted device 200 including the viewing lens, and the head mounted device 200 includes two stems, and each stem is embedded with the audio apparatus 100. Let us assume the video content depicts a vehicle passing in front of the user and moving towards the left ear of the user. In this kind of a tricky situation, there may be a lag in audio mimicking which may not provide the user with a feeling that the bike passed by the left ear of the user. Therefore, the controller 216 determines the direction of the sound waves emitted from the sound source. In a preferred embodiment, the direction of the sound waves approaching the user from the sound source is with reference to a forehead of the user. For example, if the direction of the sound waves is towards the left side of the forehead, then the controller may assume that the sound waves are approaching the left ear of the user. Thereafter, the controller sends instructions to the audio apparatus 100 to emit binaural spatial sound waves to the EEP of one of the ear which may be receiving the sound waves based on the determined direction by the controller or the controller may instruct the audio apparatus 100 in each stem 102 to emit sound to both the ears.

In an embodiment, the binaural spatial sound waves are emitted simultaneously or at different intervals by the two audio apparatuses. In the above example, since there are two audio apparatuses 100, wherein each is embedded within each stem of the head mounted device 200, the controller 216 is configured to emit the binaural spatial sound waves in situations where the sound source may move towards at least one ear of the user. Advantageously ensuring that the audio/sound heard by the user would exactly mimic the sound as heard by the user in the real world.

In an alternate embodiment, the controller is configured to delay the output of the sound of the video content utilizing interaural time difference (ITD) mechanism, thereby determining the location of the sound source, in turn the direction of the sound waves emitted from the sound source. Further, the controller 216 also ensures the location of the sound source is accurate by utilizing spectral cues. Advantageously, the controller 216 by determining the location of the sound source from the user provides another dimension to the aural space and with the spectral cues, allows the user to adequately locate the sound, thereby providing the user with immersive AR/VR/MR experience, by mimicking the sound as heard by the user in the real world.

In an embodiment, the ITD is the difference in arrival time of the sound waves between two ears. The ITD provides a cue to the direction of the sound source from the head. For example, if the sound waves approach the head from one side of the first ear of the user, the same sound waves have to travel to the second ear of the user which is located far from the first ear. This scenario creates a time difference (td=t1−t2) in view of the time taken by the sound waves to travel from the first ear to the second ear, thereby allowing the user to detect the location and direction of the sound source. In an embodiment, t1 is the instant time at which the sound waves approached the first ear and t2 is the instant time at which the sound waves approached the second ear.

The spectral cues are derived from an acoustical filtering mechanism of an individual's auditory periphery. The acoustical filtering mechanism involves the controller 216, filtering/isolating a certain frequency band from the complex sound waves emitted from the sound source using measured head related transfer functions (HRTFs). Further, the auditory periphery refers to the sound waves being transmitted from the outer ear to the first neurons of the auditory nerve.

Figure 10A:
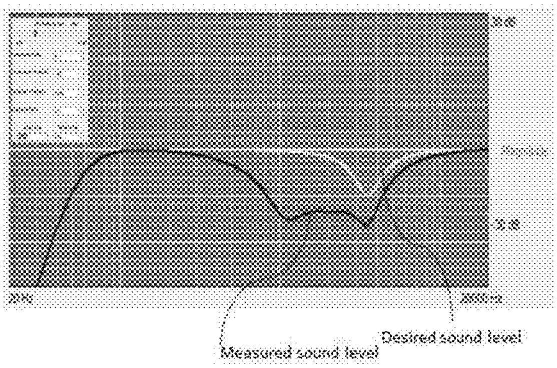
FIGS. 10A, 10B and 10C illustrates sound level curves to set an equalizing parameter and dynamic range compression (DRC) parameters for various functionalities of a head mounted device.
Figure 10B:
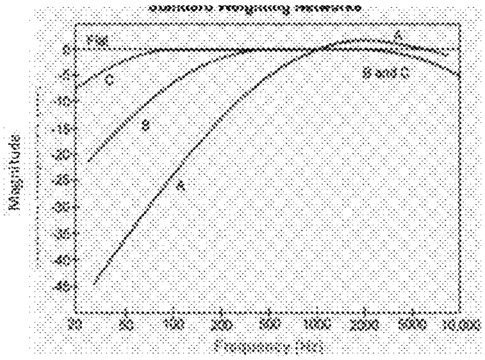

Further, in the event the head mounted device 200 is used for various functionalities, the dynamic range compression (DRC) is dynamically adjusted by the controller 216 to suit the functionality. For example, in the event the head mounted device 200 is used along with the audio apparatus 100 to watch a movie, projected in front of the viewing lens, then a dynamic range compression (DRC) is dynamically adjusted by the controller 216 for sound levels, so that during different parts of the movie, the whole audio bands of the sound waves generated by the audio apparatus 100 are perfectly heard and high pitches do not overlap with low pitches. In an embodiment, the DRC is dynamically adjusted by the controller 216, by setting a combination of DRC parameters such as, but not limited to, compression ratio, compression threshold, expansion threshold and expansion ratio, such that there is a balanced sound output. Further, equalizing parameter is adjusted such that negative gain is applied for sounds of types such as, but not limited to, metallic shimmers. For example to watch the movie, the DRC parameters are dynamically adjusted having a compression ratio of 4:1, compression threshold of −7 dB, expansion threshold of −50 dB and expansion ratio of 1:2. Further, as seen in the graph of FIG. 10A of a sound level curve, the measured sound level and desired sound level are indicated. The equalizing parameter is set by the controller in response to the user selecting the type of functionality via a user interface module for which the head mounted device 200 will be used for. In the present example, the head mounted device 200 is used for watching the movie, therefore once the user selects that functionality of watching the movie via the user interface module, the controller adjusts/sets the equalizing parameter to suit the respective functionality. The response is driven from 'A' weighted human hearing scale in which we have a peak ranging between 2 k and 5 k hz. The peak ranging between 2 k to 5 khz are suppressed to a gain of up to −6 decibels by the controller by adjusting/setting the equalizing parameter in response to the user selecting the function of watching the movie using the head mounted device 200 so that a balanced sound output is achieved as seen in FIG. 10B.

Figure 10C:
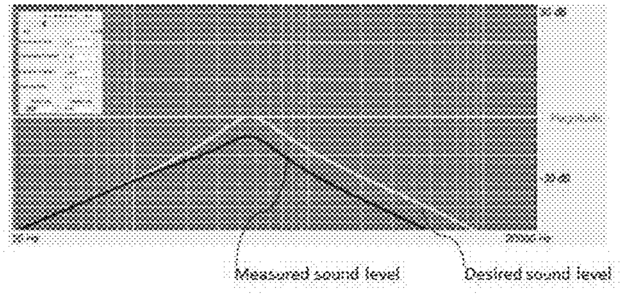

Similarly, for functionalities such as, telephonic conversations, equalizing parameter is adjusted/set by the controller in response to the user selecting the functionality of telephonic conversations via the user interface module by keeping only mid band as a constant while all other frequency ranges have been applied with a high pass filter at starting frequencies and a low pass filter at end of an audible range. Since most sound leakages are from the bass and treble levels, both have been given a negative gain, whereas the mid frequencies are typically not responsible for high power consumption as shown in FIG. 10C.

Figure 11:
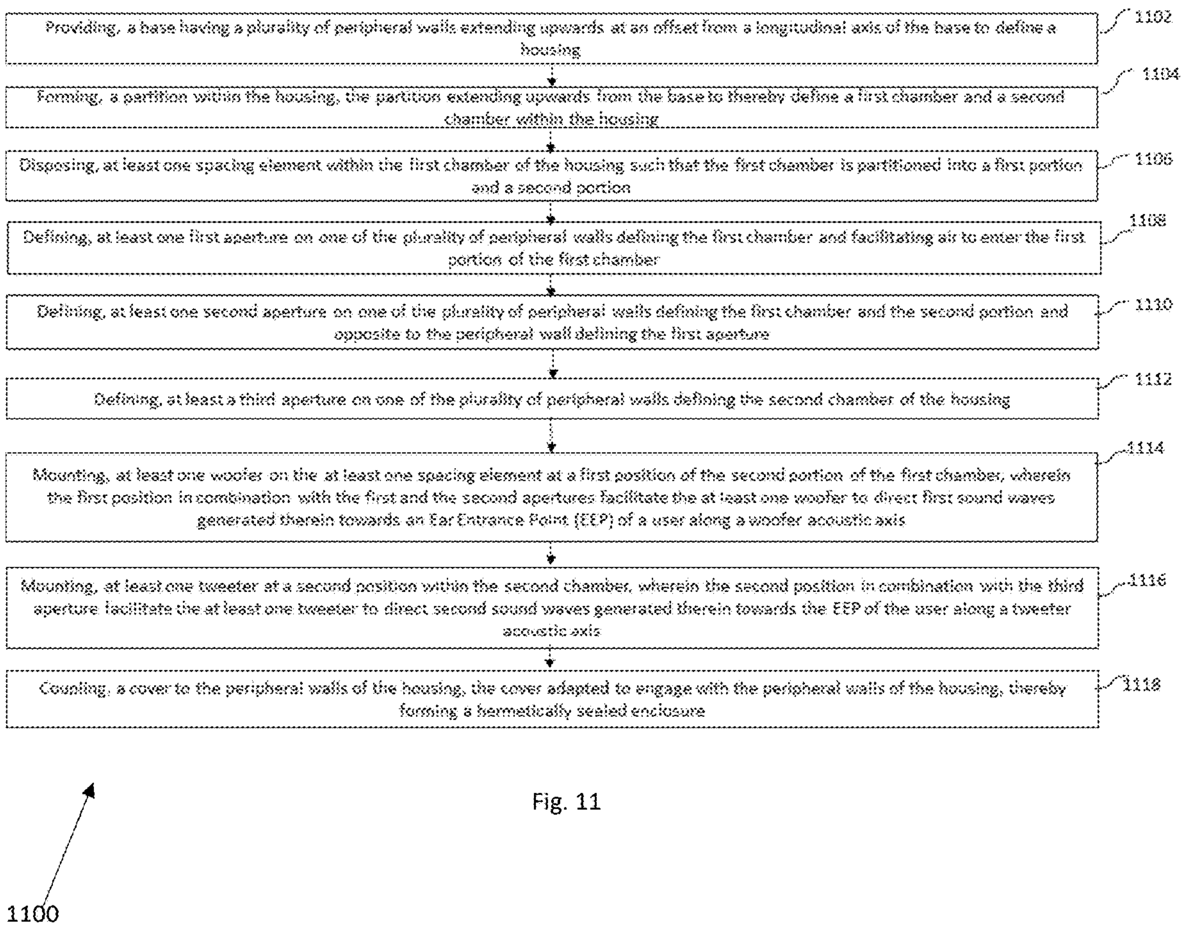
FIG. 11 illustrates a flowchart of a method for assembling an audio apparatus, according to one or more embodiments of the present invention.

FIG. 11 illustrates a flowchart of a method for assembling an audio apparatus, in accordance with an embodiment of the invention. For the purpose of description, the method is described with the embodiments as illustrated in FIG. 1 to FIG. 10. Further, in order to avoid repetition, the description for FIGS. 1-10 should be referred and should nowhere be construed as limiting the scope of the present disclosure. The method comprises the steps as indicated below:

At step 1102, providing, a base having a plurality of peripheral walls extending upwards at an offset from a longitudinal axis of the base to define a housing.

At step 1104, forming, a partition within the housing, the partition extending upwards from the base to thereby define a first chamber and a second chamber within the housing.

At step 1106, disposing, at least one spacing element within the first chamber of the housing such that the first chamber is partitioned into a first portion and a second portion. With reference to FIG. 2, the at least one spacing element is disposed within the first chamber of the housing by coupling to the peripheral walls defining the first chamber by means such as but not limited to, fasteners and glue.

At step 1108, defining, at least one first aperture on one of the plurality of peripheral walls defining the first chamber and facilitating air to enter the first portion of the first chamber. As indicated above, the first chamber is defined on one of the plurality of peripheral walls based on Helmholtz resonator mechanism.

At step 1110, defining, at least one second aperture on one of the plurality of peripheral walls defining the first chamber and the second portion and opposite to the peripheral wall defining the first aperture At step 1112, defining, at least a third aperture on one of the plurality of peripheral walls defining the second chamber of the housing.

At step 1114, mounting, at least one woofer on the at least one spacing element at a first position of the second portion of the first chamber, wherein the first position in combination with the first and the second apertures facilitate the at least one woofer to direct first sound waves generated therein towards an Ear Entrance Point (EEP) of a user along a woofer acoustic axis. Further, the positioning of the audio apparatus within the stem of the head mounted device is also important in order to ensure efficient sound propagation as illustrated in FIG. 9. The at least one woofer is mounted on the spacing element by means such as, but not limited to, fasteners, glue, etc.

At step 1116, mounting, at least one tweeter at a second position within the second chamber, wherein the second position in combination with the third aperture facilitate the at least one tweeter to direct second sound waves generated therein towards the EEP of the user along a tweeter acoustic axis. The at least one tweeter is mounted within the second chamber at the second position by means such as, but not limited to, fasteners and glue.

At step 1118, coupling, a cover to the peripheral walls of the housing, the cover adapted to engage with the peripheral walls of the housing, thereby forming a hermetically sealed enclosure. The cover is coupled to the housing by means such as, but not limited to, fasteners and glue.

As indicated above in the description, the positioning of the first aperture, the second aperture, the third aperture, the first position and the second position is based on the dipole FIG. 8 radiation pattern.

While aspects of the present invention have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present invention as determined based upon the claims and any equivalents thereof.

The invention claimed is:

1. An audio apparatus, comprising:

a base having a plurality of peripheral walls extending upwards at an offset from a longitudinal axis of the base to define a housing, and a partition formed within the housing extending upwards from the base to thereby define a first chamber and a second chamber within the housing;

at least one spacing element disposed within the first chamber of the housing thereby partitioning the first chamber into a first portion and a second portion;

at least a first aperture defined on one of the plurality of peripheral walls defining the first chamber and facilitating air to enter the first portion of the first chamber;

at least a second aperture defined on one of the plurality of peripheral walls defining the first chamber and the second portion and opposite to the peripheral wall defining the first aperture;

at least a third aperture defined on one of the plurality of peripheral walls defining the second chamber of the housing;

at least one woofer mounted on the at least one spacing element at a first position of the second portion of the first chamber, wherein the first position in combination with the first and the second apertures facilitate the at least one woofer to direct first sound waves generated therein towards an Ear Entrance Point (EEP) of a user along a woofer acoustic axis;

at least one tweeter mounted at a second position within the second chamber, wherein the second position in combination with the third aperture facilitate the at least one tweeter to direct second sound waves generated therein towards the EEP of the user along a tweeter acoustic axis; and a cover adapted to engage with the peripheral walls of the housing, thereby forming a hermetically sealed enclosure.

2. The audio apparatus as claimed in claim 1, further comprising:

a first aperture mesh coupled to a surface of the peripheral wall of the housing over the first aperture to provide an ingress protection; and a second aperture mesh coupled to the surface of the peripheral wall of the housing over the second and the third aperture to provide the ingress protection.

3. The audio apparatus as claimed in claim 1, wherein at least one signal generator is coupled to the audio apparatus via solder pads, the signal generator configured to generate and transmit electric signals to the at least woofer and the at least one tweeter, thereby allowing the at least one woofer and the at least one tweeter to vibrate at different frequencies to generate the first sound waves and the second sound waves, respectively.

4. The audio apparatus as claimed in claim 1, wherein position of the first aperture and the second aperture are determined based on a dipole FIG. 8 radiation pattern mechanism.

5. The audio apparatus as claimed in claim 1, wherein the at least one woofer is adapted to vibrate at a specific frequency range at the first portion and the second portion of the housing based on a Helmholtz resonator mechanism.

6. The audio apparatus as claimed in claim 5, wherein the at least on woofer is adapted to vibrate at the specific frequency range of at least 3-4 Khz at the first portion and the at least woofer is adapted to vibrate at the specific frequency range of at least 4-5 Khz at the second portion.

7. The audio apparatus as claimed in claim 1, wherein distance between the second aperture and the third aperture is at least 5 millimeter, thereby eliminating crossover frequency of 3 Khz and above.

8. The audio apparatus as claimed in claim 1, wherein the cover is at least one of a printed circuit board (PCB).

9. The audio apparatus as claimed in claim 1, wherein the cover includes at least two openings, each of the two openings is of a pre-determined diameter and separated by a pre-determined length from each other based on the distance between the at least one woofer and the at least one tweeter, in order to regulate pressure between the at least one woofer and the at least one tweeter in response to the first and the second sound waves generated therein.

10. A head mounted device, comprising:

at least one stem including a first end and a second end, the first end of the stem is in a proximate distance from an ear of a user and the second end protruding towards a face of the user;

at least one audio apparatus embedded within a hollow space of the at least one stem, wherein the hollow space is defined between the first end and the second end of the stem based on an optimal distance from an ear entrance point (EEP) of the user, the audio apparatus comprising:

a base having a plurality of peripheral walls extending upwards at an offset from a longitudinal axis of the base to define a housing, and a partition formed within the housing extending upwards from the base to thereby define a first chamber and a second chamber within the housing;

at least one spacing element disposed within the first chamber of the housing such that the first chamber is partitioned into a first portion and a second portion;

at least a first aperture defined on one of the plurality of peripheral walls defining the first chamber and facilitating air to enter the first portion of the first chamber;

at least a second aperture defined on one of the plurality of peripheral walls defining the first chamber and the second portion and opposite to the peripheral wall defining the first aperture;

at least a third aperture defined on one of the plurality of peripheral walls defining the second chamber of the housing;

at least one woofer mounted on the at least one spacing element at a first position of the second portion of the first chamber, wherein the first position in combination with the first and the second apertures facilitate the at least one woofer to direct first sound waves generated therein towards an Ear Entrance Point (EEP) of a user along a woofer acoustic axis;

at least one tweeter mounted at a second position within the second chamber, wherein the second position in combination with the third aperture facilitate the at least one tweeter to direct second sound waves generated therein towards the EEP of the user along a tweeter acoustic axis; and a cover adapted to engage with the peripheral walls of the housing, thereby forming a hermetically sealed enclosure.

11. The head mounted device as claimed in claim 10, further comprising a second stem along with the at least one stem, wherein the audio apparatus is embedded within the second stem and a controller is coupled to the audio apparatus embedded within the at least one stem and the second stem respectively, wherein in the event a sound source in a video content is emitting sound, the controller is configured to:

determine direction of the sound waves emitted from a sound source from the video content displayed via a viewing lens; and enable the audio apparatus present within the at least one stem and the audio apparatus present within the second stem to emit sound waves simultaneously or at different intervals to the EEP of each ear based on the determined direction of the sound waves utilizing at least one of, a binaural spatial sound wave emission mechanism, an interaural time difference (ITD) mechanism and spectral cues mechanism and a combination thereof.

12. A method of assembling an audio apparatus, the method comprises the steps of:

providing, a base having a plurality of peripheral walls extending upwards at an offset from a longitudinal axis of the base to define a housing, forming, a partition within the housing, the partition extending upwards from the base to thereby define a first chamber and a second chamber within the housing;

disposing, at least one spacing element within the first chamber of the housing such that the first chamber is partitioned into a first portion and a second portion;

defining, at least one first aperture on one of the plurality of peripheral walls defining the first chamber and facilitating air to enter the first portion of the first chamber;

defining, at least one second aperture on one of the plurality of peripheral walls defining the first chamber and the second portion and opposite to the peripheral wall defining the first aperture;

defining, at least a third aperture on one of the plurality of peripheral walls defining the second chamber of the housing;

mounting, at least one woofer on the at least one spacing element at a first position of the second portion of the first chamber, wherein the first position in combination with the first and the second apertures facilitate the at least one woofer to direct first sound waves generated therein towards an Ear Entrance Point (EEP) of a user along a woofer acoustic axis;

mounting, at least one tweeter at a second position within the second chamber, wherein the second position in combination with the third aperture facilitate the at least one tweeter to direct second sound waves generated therein towards the EEP of the user along a tweeter acoustic axis; and coupling, a cover to the peripheral walls of the housing, the cover adapted to engage with the peripheral walls of the housing, thereby forming a hermetically sealed enclosure.

* * * * *